United States Patent
Nakao et al.

(10) Patent No.: US 7,084,211 B2
(45) Date of Patent: Aug. 1, 2006

(54) COLD SETTING COATING COMPOSITION

(75) Inventors: Tadahiro Nakao, Kanagawa (JP);
Chicara Kawamura, Kanagawa (JP);
Toshihiro Hamamura, Kanagawa (JP);
Hiroyuki Tsukadaira, Tokyo (JP);
Masami Sugishima, Tokyo (JP)

(73) Assignee: Kansai Paint Co., Ltd., Kanagawa (JP)

( * ) Notice: Subject to any disclaimer, the term of this patent is extended or adjusted under 35 U.S.C. 154(b) by 336 days.

(21) Appl. No.: 10/677,366

(22) Filed: Oct. 3, 2003

(65) Prior Publication Data

US 2004/0072965 A1    Apr. 15, 2004

Related U.S. Application Data

(62) Division of application No. 09/804,293, filed on Mar. 13, 2001, now abandoned.

(30) Foreign Application Priority Data

| Mar. 14, 2000 | (JP) | ............................ 2000-069881 |
| Mar. 17, 2000 | (JP) | ............................ 2000-075653 |

(51) Int. Cl.
| C08L 33/06 | (2006.01) |
| C08L 33/08 | (2006.01) |
| C08L 33/10 | (2006.01) |
| C08L 33/12 | (2006.01) |
| C08L 37/00 | (2006.01) |

(52) U.S. Cl. ...................... 525/208; 525/123; 525/128; 525/327.3

(58) Field of Classification Search ...................... None
See application file for complete search history.

(56) References Cited

U.S. PATENT DOCUMENTS

| 4,482,691 A | 11/1984 | Saunders et al. ............. 528/69 |
| 4,694,052 A | 9/1987 | Hirose et al. |

FOREIGN PATENT DOCUMENTS

| DE | 198 58 554 A1 | | 6/2000 |
| GB | 793776 B1 | | 4/1958 |
| JP | 50-12138 A | * | 2/1975 |
| JP | 50-12138 A1 | | 2/1975 |
| JP | 54-87737 A1 | | 7/1979 |
| JP | 56-61426 A1 | | 5/1981 |
| JP | 57-126803 A1 | | 8/1982 |
| JP | 06-49368 A1 | | 2/1984 |
| JP | 05-271367 A | * | 10/1993 |
| JP | 05-271367 A1 | | 10/1993 |
| JP | 06-49368 A | * | 2/1994 |
| WO | WO-97/21748 A1 | | 6/1997 |

* cited by examiner

*Primary Examiner*—Robert Sellers
(74) *Attorney, Agent, or Firm*—Rader, Fishman & Grauer PLLC

(57) ABSTRACT

A cold setting coating composition comprises an urethane-modified vinyl resin (A) produced by reacting a reaction product with an isocyanate group-possessing compound (c). The reaction product is produced by reacting an epoxy group-containing vinyl copolymer (a) with a fatty acid component (b) containing an unsaturated fatty acid. The vinyl copolymer (a) is a copolymer of a first polymerizable unsaturated monomer containing an epoxy group and a second polymerizable unsaturated monomer. The composition also comprises a polymer dispersion (B) obtained by polymerizing two or more of vinyl monomers in the presence of a dispersion stabilizer (d) in an organic liquid in which vinyl monomers are soluble and a polymer formed from the monomers is insoluble. The dispersion stabilizer (d) is soluble in the organic liquid. The coating composition improved weathering resistance and water resistance of the resulting coated film.

10 Claims, No Drawings

COLD SETTING COATING COMPOSITION

This application is a divisional of application Ser. No. 09/804,293 filed Mar. 13, 2001 now abandoned.

TECHNICAL FIELD OF THE INVENTION

The present invention relates to a cold setting coating composition capable of forming an elastic coated film excellent in weathering resistance and water resistance using an oxidatively curable urethane-modified vinyl resin.

BACKGROUND OF THE INVENTION

Hitherto, an alkyd resin using an unsaturated fatty acid is well known as a cold setting resin for coating which is stable in a solution state for a long period of time, and is widely used as a coating for inside and outside of a building. However, the alkyd resin tends to cause weather-deterioration by ultraviolet ray, so that its performance is insufficient for outdoor use. As measures for solving the problem of weathering resistance, for example, a fatty acid-modified acrylic resin has been proposed in British patent No. 793,776, and a non-aqueous dispersion-type acrylic resin obtained by dispersion polymerization in the presence of the fatty acid-modified acrylic resin has been proposed in Japanese Patent Publication No. 3-71448/1991. However, in the case of fatty acid-modified acrylic resin, the weathering resistance was improved a little but the coating performances such as weathering resistance, water resistance and acid and alkali resistances were still not satisfactory. Furthermore, in the case of the above non-aqueous dispersion-type acrylic resin, secondary particles having a large particle size formed during the production reaction, so that it was impossible to obtain a stable dispersion having a narrow particle size distribution and the gloss of coated film is also insufficient.

In Japanese Patent Publication No. 52-26260/1977, there has been proposed a non-aqueous dispersion-type acrylic resin produced by dispersion polymerization in the presence of an acrylic resin where a vinyl monomer having an oxidatively curable unsaturated group is used as a copolymerizing component. In this case, a stable non-aqueous dispersion could be obtained and it was possible to form a coated film excellent in water resistance, acid resistance, alkali resistance and the like, but there existed a problem that the initial dryness of coated film is insufficient.

SUMMARY OF THE INVENTION

An object of this invention is to improve weathering resistance and water resistance of a coated film made from a cold setting coating composition of the present invention. Another object of the present invention is to improve crack-following ability of the undercoat. For these purposes, the cold setting coating composition of the present invention contains an urethane-modified vinyl resin (A) as a film-forming component. The resin (A) is produced by reacting a reaction product with an isocyanate group-possessing compound (c). The reaction product is made by reacting an epoxy group-containing vinyl copolymer (a), which is a copolymer of a polymerizable unsaturated monomer containing an epoxy group, with another polymerizable unsaturated monomer capable of polymerizing with said monomer, and a fatty acid component (b) containing an unsaturated fatty acid. The epoxy group-containing vinyl copolymer (a) may be produced by copolymerizing 3 to 70% by weight of the polymerizable unsaturated monomer containing an epoxy group with 30 to 97% by weight of the other polymerizable unsaturated monomer. The epoxy group-containing vinyl copolymer (a) may have a number average molecular weight of 1,000 to 100,000 and a glass transition temperature of 0 to 100° C. The fatty acid component (b) containing an unsaturated fatty acid may have an iodine value of 50 to 200. The ratio of the fatty acid component (b) containing an unsaturated fatty acid may be from 1 to 60 parts by weight based on 100 parts by weight of the epoxy group-containing vinyl copolymer (a). An equivalent ratio of the isocyanate group to the hydroxyl group in the fatty acid-modified copolymer (NCO/OH) may be from 0.05 to 2.0.

In addition to the resin (A), the cold setting coating composition of the present invention may further contain a polymer-dispersion (B) obtained by polymerizing, in an organic liquid in which vinyl monomers are soluble and the polymer formed from the monomers are insoluble, two or more of the vinyl monomers in the presence of a dispersion stabilizer (d) which is soluble in the organic liquid, in amounts of 10 to 90% by weight of (A) and 90 to 10% by weight of (B) based on total solid matter weight of both of them. The dispersion stabilizer (d) may be a resin having an oxidatively polymerizable double bond. The resin having an oxidatively polymerizable double bond may be a resin obtained by copolymerizing a vinyl monomer having an oxidatively polymerizable double bond and another vinyl monomer.

PREFERRED EMBODIMENTS OF THE INVENTION

The present invention, the urethane-modified vinyl resin (A) is an oxidatively curable resin produced by further reacting, with an isocyanate group-possessing compound (c), a reaction product between an epoxy group-containing vinyl copolymer (a) and a fatty acid component (b) containing an unsaturated fatty acid.

The example of the polymerizable unsaturated monomer containing an epoxy group which is a copolymerizing component of the above epoxy group-containing vinyl copolymer (a) include glycidyl (meth)acrylate, β-methylglycidyl (meth)acrylate, 3,4-epoxycyclohexylmethyl (meth)acrylate, 3,4-epoxycyclohexylpropyl (meth)acrylate, allyl glycidyl ether, and the like.

The examples of the other polymerizable unsaturated monomer include acrylic or methacrylic acid esters of alkyl or cycloalkyl having 1 to 24 carbon atoms such as methyl (meth)acrylate, ethyl (meth)acrylate, n-butyl (meth)acrylate, isobutyl (meth)acrylate, t-butyl (meth)acrylate, hexyl (meth)acrylate, 2-ethylhexyl (meth)acrylate, n-octyl (meth)acrylate, decyl (meth)acrylate, lauryl (meth)acrylate, stearyl (meth)acrylate, cyclohexyl (meth)acrylate, isobornyl (meth)acrylate; hydroxyl group-containing monomers including hydroalkyl esters of α,β-ethylenically unsaturated carboxylic acids such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate, and α,β-ethylenically unsaturated carboxylic acid esters having an alkylene oxide chain and hydroxyl group such as polyethylene glycol mono(meth)acrylate, polypropylene glycol mono(meth)acrylate; 1,2,2,6,6-pentamethylpiperidyl (meth)acrylate, 2,2,6,6-tetramethylpiperidinyl (meth)acrylate, 2-(2'-hydroxy-5'-methacryloxyphenyl) -2H-benzotriazole, styrene, vinyl acetate, and the like.

In the epoxy group-containing vinyl copolymer (a), it is suitable that the copolymerization ratio between the polymerizable unsaturated monomer containing an epoxy group and the above other polymerizable unsaturated monomer usually ranges 3 to 70% by weight, preferably 10 to 50% by weight for the polymerizable unsaturated monomer containing an epoxy group, and 30 to 97% by weight, preferably 50 to 90% by weight for the above other polymerizable unsaturated monomer in view of the reactivity for addition at the reaction with the unsaturated fatty acid (b) and the solubility of the resulting epoxy group-containing vinyl copolymer (a) in a solvent.

In the epoxy group-containing vinyl copolymer (a), when a hydroxyl group-containing monomer is used, the monomer is used in an amount so that gelation does not occur during the reaction with the polyisocyanate compound (c). Usually, it is suitable to use the hydroxyl group-containing monomer in an amount of 30% by weight or less among the monomer components constituting the vinyl copolymer (a).

The method of copolymerization for obtaining the above epoxy group-containing vinyl copolymer (a) is not particularly limited but solution polymerization which is carried out in an organic solvent in the presence of a radical polymerization initiator is preferable from the viewpoint of the easiness of the reaction with the fatty acid component (b) and the isocyanate group-possessing compound (c).

The examples of the radical polymerization initiator to be used for the synthesis of the above epoxy group-containing vinyl copolymer (a) by solution polymerization include azo-type polymerization initiators such as 2,2'-azobisisobutyronitrile and 2,2'-azobis(2,4-dimethylvaleronitrile); peroxide-type polymerization initiators such as lauryl peroxide, t-butyl peroxy-2-ethylhexanoate and benzoyl peroxide. The examples of the organic solvent for the synthesis by solution polymerization include aliphatic hydrocaron-type solvents such as n-hexane, n-octane, 2,2,2-trimethylpentane, isooctane, n-nonane, cyclohexane and methylcyclohexane; aromatic hydrocarbon-type solvents such as benzene, toluene, xylene and ethylbenzene; petroleum-type solvents such as mineral spirit, "Swasol 1000" (a product of Cosmo Oil Co., Ltd.), petroleum ether, petroleum benzine and petroleum naphtha; ketone-type solvents such as methyl isobutyl ketone; ester-type solvents such as isobutyl acetate; alcohol-type solvents such as isopropanol, and these can be optionally used solely or in combination of two or more according to necessity.

The above epoxy group-containing vinyl copolymer (a) preferably has a number average molecular weight in the range of 1,000 to 100,000, particularly 2,000 to 70,000 and a glass transition temperature (Tg) in the range of 0 to 100° C. in view of the physical properties of the resulting coated film and quick drying ability.

The above fatty acid component (b) is a fatty acid component necessarily containing an unsaturated fatty acid and optionally containing a saturated fatty acid, and is suitably has an iodine value in the range of about 50 to 200. When the iodine value is less than about 50, the curability of the coated film decreases, while there is a possibility of gelation during the production of the resin when the iodine value exceeds about 200. Thus, both cases are not preferred.

The representative examples of the unsaturated fatty acid which is a necessary component of the fatty acid component (b) include fish oil fatty acids, dehydrated caster oil fatty acids, safflower oil, linseed oil fatty acids, soybean oil fatty acids, sesame oil fatty acids, poppy seed oil fatty acids, perilla oil fatty acids, hempseed oil fatty acids, grape seed oil fatty acids, corn oil fatty acids, tall oil fatty acids, sunflower oil fatty acids, cotton seed oil fatty acids, walnut oil fatty acids, rubberseed oil fatty acids, and the like. The unsaturated fatty acid is a fatty acid having an oxidatively curable polymerizable unsaturated group, and imparts oxidative curability to the urethane-modified vinyl resin in the present invention.

The examples of the saturated fatty acid which the fatty acid component (b) may contain in addition to the above unsaturated fatty acid according to necessity include non-drying oil fatty acids such as coconut oil fatty acids, hydrogenated coconut oil fatty acids and palm oil fatty acids; caproic acid, capric acid, lauric acid, myristic acid, palmitic acid, stearic acid and the like.

The ratio of the fatty acid component (b) to be used is preferably from 1 to 60 parts by weight, preferably 5 to 30 parts by weight based on 100 parts by weight of the resin solid matter of the above epoxy group-containing vinyl copolymer (a) in view of the curability and weathering resistance of the resulting coated film.

In the present invention, the reaction between the epoxy group-containing vinyl copolymer (a) and the fatty acid component (b) is based on esterification of the epoxy group in the copolymer (a) with the carboxyl group in the fatty acid component (b), and a secondary hydroxyl group is usually formed by the reaction. At the reaction, there may be used a reaction catalyst including a tertiary amine such as N,N-dimethylaminoethanol; a quaternary ammonium salt such as tetrabutylammonium bromide; and the like. In the case of using the reaction catalyst, the amount to be used is suitably in the range of 0.01 to 100 parts by weight based on the total amount of the copolymer (a) and the fatty acid component (b).

The conditions for the reaction of the copolymer (a) and the fatty acid component (b) may be any of the conditions under which the epoxy group in the copolymer (a) can be reacted with the carboxyl group in the fatty acid component (b) without occurring problems at the reaction such as gelation, and the conditions of heating at about 100 to 170° C. for about 2 to 10 hours may be usually suitable.

The examples of the isocyanate group-possessing compound (c) to be reacted with the fatty acid-modified copolymer produced as above include aromatic, alicyclic or aliphatic polyisocyanate compounds such as tolylene diisocyanate, xylylene diisocyanate, phenylene diisocyanate, diphenylmethane diisocyanate, bis(isocyanatemethyl) cyclohexane, tetramethylene diisocyanate, hexamethylene diisocyanate, trimethylhexamethylene diisocyanate, methylene diisocyanate and isophorone diisocyanate; and isocyanurate compounds or biuret compounds thereof; terminal isocyanate-containing compounds produced by reacting an excess amount of these polyisocyanate compounds with a low molecular weight compound containing an active hydrogen such as ethylene glycol, propylene glycol, trimethylolpropane, hexanetriol or caster oil; lysine triisocyanate and the like.

The amount of the above isocyanate group-possessing compound (c) to be used may be determined so that the equivalent ratio (NCO/OH) of the isocyanate group in the isocyanate group-possessing compound (c) to the hydroxyl group in the fatty acid-modified copolymer becomes from 0.05 to 2.0, preferably from 0.1 to 1.2 in view of weathering resistance and physical properties of the coated film to be formed.

At the reaction of the above isocyanate group-possessing compound (c) with the fatty acid-modified copolymer produced by the reaction between (a) and (b), in the case that the viscosity of the reaction system exceeds the suitable range by its increase with the proceeding of the reaction, for example, the reaction can be controlled by adding suitable amount of an alcohol, an phenol, a lactam, an oxime or the like.

The reaction of the above fatty acid-modified copolymer with the isocyanate group-possessing compound (c) may be carried out in the presence of a reaction catalyst, if necessary. The above reaction is based on the reaction between the hydroxyl groups in the fatty acid-modified copolymer and the isocyanate groups in the isocyanate group-possessing compound (c). The hydroxyl groups in the above fatty acid-modified copolymer may be the hydroxyl groups originally present in the copolymer (a) and the hydroxyl groups formed by the reaction of the copolymer (a) and the fatty acid component (b).

The examples of the above reaction catalyst include organometallic compounds such as dibutyltin bis(acetylacetonate), dibutyltin diacetate, dibutyltin di(2-ethylhexylate), dibenzyltin di(2-ethylhexylate), dibutyltin dilaurate, dibutyltin diisoocylmaleate and tetrabutyl titanate. These reaction catalysts may be used solely or in combination of two or more.

The above reaction catalyst is suitably used in an amount of 0.001 to 5 parts by weight, preferably 0.005 to 1 part by weight based on 100 parts by weight of total amount of the fatty acid-modified copolymer and the isocyanate group-possessing compound (c) in view of the accelerating effect of the reaction.

The coating composition of the present invention contains the above urethane-modified vinyl resin as a film-forming component, and may also contain, as a film-forming component to be used in combination with the above vinyl resin, a polymer dispersion (B) produced by polymerizing two or more of vinyl monomers in an organic liquid in which the vinyl monomers are soluble and the polymer formed from the monomers are insoluble, in the presence of a dispersion stabilizer (d) which is soluble in the organic liquid.

The above polymer dispersion (B) is obtained by polymerizing two or more of the vinyl monomers in an organic liquid in which vinyl monomers are soluble and the polymer formed from the monomers are insoluble, in the presence of a dispersion stabilizer (d) which is soluble in the organic liquid.

The examples of the above organic liquid include aliphatic hydrocarbon-type solvents such as n-hexane, n-octane, 2,2,2-trimethylpentane, isooctane, n-nonane, cyclohexane and methylcyclohexane; petroleum-type solvents such as mineral spirit, "SWAZOLE 1000" (a product of Cosmo Oil Co., Ltd.), petroleum ether, petroleum benzine and petroleum naphtha; and the like, and these may be used solely or in combination of two or more. In combination with these solvents, there may be used aromatic hydrocarbon-type solvents such as benzene, toluene, xylene and ethylbenzene; ketone-type solvents such as methyl isobutyl ketone; ester-type solvents such as isobutyl acetate; alcohol-type solvents such as isopropanol; and the like according to necessity.

As the dispersion stabilizer (d) soluble in the above organic solvent, various kinds of hitherto known resins can be used and usually a resin having a number average molecular weight of about 1,000 to 100,000 is used. Particularly, as the dispersion stabilizer (d), a resin having an oxidatively polymerizable double bond is preferable in view of the curability of the coated film to be formed. The resin having an oxidatively polymerizable double bond is usually a resin obtained by radical copolymerization of 5 to 70% by weight, preferably 15 to 50% by weight of a vinyl monomer having an oxidatively polymerizable double bond and 30 to 95% by weight, preferably 50 to 85% by weight of the other vinyl monomer in the above organic solvent in the presence of radical polymerization initiator. When the amount of the vinyl monomer having an oxidatively polymerizable double bond in the copolymer is too small, there is a possibility that sufficient curing cannot be attained especially at early stage of the film formation. On the other hand, when the amount is too large, there is a possibility that unreacted monomer may remain. Thus, both cases are undesirable.

The examples of the vinyl monomer having an oxidatively polymerizable double bond include dicyclopentadiene derivatives such as dihydrodicyclopentadiene mono(meth)acrylate, dihydrodicyclopentadieneethyl mono(meth)acrylate and dihydrodicyclopentadiene monoallyl ether.

The examples of other vinyl monomers include styrene, methyl (meth)acrylate, ethyl (meth)acrylate, n-butyl (meth)acrylate, isobutyl (meth)acrylate, t-butyl (meth)acrylate, hexyl (meth)acrylate, 2-ethylhexyl (meth)acrylate, n-octyl (meth)acrylate, decyl (meth)acrylate, lauryl (meth)acrylate, stearyl (meth)acrylate, cyclohexyl (meth)acrylate, isobornyl (meth)acrylate, (meth)acrylic acid, 2-hydroxyethyl (meth)acrylate, glycidyl (meth)acrylate and the like, and these may be used solely or in combination of two or more.

The examples of the above radical polymerization initiator include azo-type polymerization initiators such as 2,2'-azobisisobutyronitrile and 2,2'-azobis(2,4-dimethylvaleronitrile); peroxide-type polymerization initiator such as lauryl peroxide, t-butyl peroxy-2-ethylhexanoate and benzoyl peroxide.

The examples of the vinyl monomer to be polymerized in the presence of the dispersion stabilizer (d) obtained as above include methyl (meth)acrylate, ethyl (meth)acrylate, n-butyl (meth)acrylate, isobutyl (meth)acrylate, t-butyl (meth)acrylate, hexyl (meth)acrylate, 2-ethylhexyl (meth)acrylate, (meth)acrylonitrile, 2-methoxyethyl (meth)acrylate, 2-methoxybutyl (meth)acrylate, (meth)acrylamide, vinylpyrrolidone, (meth)acrylic acid, maleic acid, 2-hydroxyethyl (meth)acrylate, 2-hydroxypropyl (meth)acrylate, 3-hydroxypropyl (meth)acrylate, 4-hydroxypropyl (meth)acrylate, 4-hydroxybutyl (meth)acrylate, glycidyl (meth)acrylate, styrene, vinyltoluene, α-methylstyrene and vinyl acetate, and these may be used solely or in combination of two or more.

In view of the balance of elasticity and strain resistance, a multivinyl compound may be used in an amount of 2% by weight or less as the above vinyl monomer. The examples of the multivinyl compound include polymerizable unsaturated monocarboxylic acid esters of a polyhydric alcohol, polymerizable unsaturated alcohol esters of a polybasic acid and aromatic compounds substituted by two or more of vinyl groups, more specifically allyl (meth)acrylate, dipropyleneglycol di(meth)acrylate, 1,6-hexandiol di(meth)acrylate, dipentaerythritol hexa(meth)acrylate, 2-propenyl (meth)acrylate, 1,1,1-trishydroxymethylethane di(meth)acrylate, triallylisocyanurate, divinylbenzene and the like.

The above dispersion polymerization is carried out in the above organic liquid in the presence of a radical polymerization initiator. As the radical polymerization initiator, the same ones as mentioned above can be used.

The polymer dispersion (B) obtained as above is a stable dispersion of the particles having a light intensity average particle size of 150 to 900 nm, mostly about 250 to 400 nm according to dynamic light scattering.

The coating composition of the present invention may contain additives for coating such as an oxidative curing reaction catalyst, a pigment, an organic solvent, an ultraviolet absorber, a light stabilizer, a surface controller, a pigment dispersant, a rheology controller, a skin-forming inhibitor of coating liquid, an antiseptic agent, antialgae agent, a plasticizer, an antifoaming agent and the like according to necessity.

The examples of the above oxidative curing reaction catalyst include organometallic compounds such as cobalt octylate, cobalt naphthenate, manganese octylate, manganese naphthenate, zirconium octylate and zirconium naphthenate. In addition, a compound activating catalytic action such as 1,10-phenanthroline may be used in combination with the oxidative curing reaction catalyst.

The examples of the rheology controller include thickening agents such as polyethylene oxide and a fatty acid amide wax, and alkoxysilyl compounds or condensates thereof, and these may be used solely or in combination of two or more.

The coated film obtained from the composition of the present invention has very good appearance such as surface gloss and is excellent in weathering resistance, chemical resistance and alkali resistance, as well as, in the presence of oxidative curing reaction catalyst, the composition can be cured within several hours after the coating and shows excellent cold setting ability.

The coating composition of the present invention is applicable to the surfaces of materials such as metal, slate and mortar, undercoat (e.g., sealing material, primer, thickness-main material) surfaces thereof, or old coated surfaces, and is useful especially for inorganic building materials such as slate and mortar and for coated surfaces thereof having elasticity.

EXAMPLES

The following will explain the present invention in detail with reference to Examples. "part(s)" and "%" means "part(s) by weight" and "% by weight", respectively.

Production of Urethane-Modified Vinyl Resin Solutions

Production Example 1

Into a flask was charged 100 parts of mineral spirit, followed by the elevation of temperature to 115° C. under stirring with introducing nitrogen gas. Then, the below-described mixture of monomers and other compound were added dropwise thereto over a period of 4 hours with maintaining the temperature at 115° C.

| | |
|---|---|
| styrene | 20 parts |
| n-butyl methacrylate | 25 parts |
| i-butyl methacrylate | 10 parts |
| 2-ethylhexyl acrylate | 25 parts |
| glycidyl methacrylate | 20 parts |
| 2,2'-azobisisobutyronitrile | 1 part |

Then, after aging at 115° C. for 2 hours and then the temperature was elevated to 140° C., 30 parts of linseed oil fatty acids and 0.4 part of N,N-dimethylaminoethanol as the reaction catalyst were added thereto, and the mixture was maintained at 160° C. for 5 hours to carry out the addition of the fatty acids. The resin acid value was traced by KOH titration method and the end point was determined as the time point at which the resin acid value was decreased to 1.0 or lower. After the completion of the reaction, the mixture was diluted by adding 45 parts of xylene to obtain a brown clear viscous fatty acid-modified copolymer solution (a-1), 50% of which was nonvolatile matter.

The fatty acid-modified copolymer solution (a-1) was cooled to 100° C., and 5 parts of "Desmodur H" (manufactured by Sumitomo Bayer Urethane Co., Ltd., hexamethylene diisocyanate), 14 parts of mineral spirit, 6 parts of xylene and 0.05 part of dibutyltin dilaurate as a reaction catalyst were added therein. Then, the whole was reacted at the same temperature for 2 hours to obtain a brown clear viscous urethane-modified vinyl resin solution (A-1), about 45% of which was nonvolatile matter.

Production Example 2

To 275 parts of 50% fatty acid-modified copolymer solution (a-1) obtained in Production Example 1 were added 12 parts of "TPA-100" (manufactured by Asahi Chemical Co., Ltd., isocyanurate of hexamethylene diisocyanate), 30 parts of xylene and 0.05 part of dibutyltin dilaurate as a reaction catalyst, and the whole was reacted for 1 hour with maintaining the temperature at 100° C. Then, 2 parts of n-butyl alcohol was added thereto and the mixture was further reacted for 1 hour to obtain a brown clear viscous urethane-modified vinyl resin solution (A-2), about 45% of which was nonvolatile matter.

Production Example 3

To 275 parts of the 50% fatty acid-modified copolymer solution (a-1) obtained in Production Example 1 were added 23 parts of "TSE-100" (manufactured by Asahi Chemical Co., Ltd., the one obtained by modifying isocyanurate of hexamethylene diisocyanate to soft-type), 30 parts of mineral spirit, 15 parts of xylene and 0.05 part of dibutyltin dilaurate as a reaction catalyst, and the whole was reacted for 1 hour with maintaining the temperature at 100° C. Then, 2 parts of n-butyl alcohol was added thereto and the mixture was further reacted for 1 hour to obtain a brown clear viscous urethane-modified vinyl resin solution (A-3), about 45% of which was nonvolatile matter.

Production Example 4

Into a flask was charged 100 parts of mineral spirit, followed by the elevation of temperature to 115° C. under stirring with introducing nitrogen gas. Then, the below-described mixture of monomers and other compound were added dropwise thereto over a period of 4 hours with maintaining the temperature at 115° C.

| | |
|---|---|
| styrene | 15 parts |
| n-butyl methacrylate | 25 parts |
| i-butyl methacrylate | 10 parts |
| 2-ethylhexyl acrylate | 25 parts |
| glycidyl methacrylate | 20 parts |
| "RUVA-093" (Note 1) | 5 parts |
| 2,2'-azobisisobutyronitrile | 1 part |

Then, after aging at 115° C. for 2 hours and then the temperature was elevated to 140° C., 30 parts of linseed oil fatty acids and 0.4 part of N,N-dimethylaminoethanol as a reaction catalyst were added thereto, and the mixture was maintained at 160° C. for 5 hours to carry out the addition of the fatty acids. The resin acid value was traced by KOH titration method and the end point was determined as the time point at which the resin acid value was decreased to 1.0 or lower. After the completion of the reaction, the mixture was diluted by adding 45 parts of xylene to obtain a brown clear viscous fatty acid-modified copolymer solution (a-2), 50% of which was nonvolatile matter.

The fatty acid-modified copolymer solution (a-2) was cooled to 100° C., and 5 parts of "DESMODUR H" (manufactured by Sumitomo Bayer Urethane Co., Ltd., hexamethylene diisocyanate), 14 parts of mineral spirit, 6 parts of xylene and 0.05 part of dibutyltin dilaurate as a reaction catalyst were added therein. Then, the whole was reacted at the same temperature for 2 hours to obtain a brown clear viscous urethane-modified vinyl resin solution (A-4), about 45% of which was nonvolatile matter.

(Note 1) "RUVA-093": manufactured by Otsuka Chemical Co., Ltd., 2-(2'-hydroxy-5'-methacryloxyphenyl)-2H-benzotriazole Production Example 5

Into a flask was charged 100 parts of mineral spirit, followed by the elevation of temperature to 115° C. under stirring with introducing nitrogen gas. Then, the mixture of:

| styrene | 25 parts |
| n-butyl methacrylate | 14 parts |
| i-butyl methacrylate | 16 parts |
| 2-ethylhexyl acrylate | 18 parts |
| glycidyl methacrylate | 27 parts |
| 2,2'-azobisisobutyronitrile | 1 part | was added dropwise thereto over a period of 4 hours with maintaining the temperature at 115° C. Then, after aging at 115° C. for 2 hours and then the temperature was elevated to 140° C., 43 parts of soybean oil fatty acids and 0.4 part of N,N-dimethylaminoethanol as a reaction catalyst were added thereto to carry out the addition of the fatty acids. The resin acid value was traced by KOH titration method and the end point was determined as the time point at which the resin acid value was decreased to 1.0 or lower. After the completion of the reaction, the mixture was diluted by adding 45 parts of mineral spirit and the temperature was lowered to 120° C. Then, 6.7 parts of hexamethylene diisocyanate was added thereto and the mixture was reacted at the same temperature for 1 hour to obtain a brown clear urethane-modified vinyl resin solution (A-5), 51% of which was nonvolatile matter.

Production Example 6

A brown clear urethane-modified vinyl resin solution (A-6), 51% of which was nonvolatile matter, was obtained in a similar manner to Production Example 5 with the exception that the unsaturated fatty acids to be used for the production of the urethane-modified vinyl resin solution was changed from soybean oil fatty acids in Production Example 5 to linseed oil fatty acids.

Production Example 7

Into a flask was charged 53 parts of mineral spirit, followed by the elevation of temperature to 115° C. under stirring with introducing nitrogen gas. Then, the mixture of:

| styrene | 25 parts |
| n-butyl methacrylate | 14 parts |
| i-butyl methacrylate | 16 parts |
| 2-ethylhexyl acrylate | 18 parts |
| 2-hydroxyethyl methacrylate | 27 parts |
| 2,2'-azobisisobutyronitrile | 1 part | was added dropwise thereto over a period of 4 hours with maintaining the temperature at 115° C. Then, the mixture was aged at 115° C. for 2 hours to obtain a colorless clear acrylic resin solution, 65% of which was nonvolatile matter. Then, 154 parts of the acrylic resin solution, 43 parts of soybean oil fatty acids and 24 parts of xylene were charged to a reaction apparatus fitted with a thermometer, a stirrer, a heating device and a rectifying tower, and the temperature was elevated under stirring with introducing nitrogen gas. The esterification of the hydroxyl groups in the acrylic acid resin backbone with the fatty acids was carried out under xylene reflux at a reaction temperature of 170° C. with removing the water formed during the condensation. The resin acid value was traced by KOH titration method and the end point was determined as the time point at which the resin acid value was decreased to 1.0 or lower. After the completion of the reaction, the mixture was diluted by adding 65 parts of mineral spirit and the temperature was lowered to 120° C. Then, 6.7 parts of hexamethylene diisocyanate was added thereto and the mixture was reacted at the same temperature for 1 hour to obtain a brown clear urethane-modified vinyl resin solution (A-7), 51% of which was nonvolatile matter.

Production Example 8

An urethane-modified vinyl resin solution (A-8) was obtained in a similar manner to Production Example 5 with the exception that 6.7 parts of the hexamethylene diisocyanate to be used for the production of the urethane-modified vinyl resin solution in Production Example 5 was changed to 73.4 parts of the urethane derivative produced in the following step (Note 2).

(Note 2) Into a flask were charged 600 parts of methyl ethyl ketone and 900 parts of polypropylene glycol having an average molecular weight of 900, followed by the elevation of temperature to 50° C. under stirring with introducing nitrogen gas. Then, 336 parts of hexamethylene diisocyanate was added dropwise therein over a period of about 30 minutes. At that time, when the reaction temperature was elevated to 80° C., the temperature was maintained at 80° C. by controlling the addition rate or cooling. After the completion of the addition, the whole was reacted at the same temperature for 2 hours to obtain an urethane derivative having isocyanate groups at both ends.

Production of Polymer Dispersions

Production Example 9

Into a flask was charged 80 parts of mineral spirit (manufactured by Nippon Oil Company, Ltd., "NISSEKI A SOL- VENT"), followed by the elevation of temperature to 110° C. under stirring with introducing nitrogen gas. Then, the mixture of:

| | | |
|---|---|---|
| styrene | 25 | parts |
| n-butyl methacrylate | 12 | parts |
| i-butyl methacrylate | 43 | parts |
| 2-ethylhexyl acrylate | 20 | parts |
| 2,2'-azobisisobutyronitrile | 1.5 | parts | was added dropwise thereto over a period of 4 hours with maintaining the temperature at 110° C. Then, after the temperature was elevated to 120° C., the mixture was aged for 2 hours to obtain an almost colorless clear viscous acrylic resin solution, 55% of which was nonvolatile matter. This solution was used as a dispersion stabilizer.

Into a flask were charged 185.4 parts of the dispersion stabilizer produced in the above, 25.5 parts of isobutyl acetate and 101 parts of mineral spirit, followed by the elevation of temperature to 100° C. under stirring with introducing nitrogen gas. Then, a mixture of:

| | | |
|---|---|---|
| methyl methacrylate | 25 | parts |
| ethyl acrylate | 15 | parts |
| methyl acrylate | 40 | parts |
| 2-hydroxyethyl acrylate | 20 | parts |
| 2,2'-azobisisobutyronitrile | 1.5 | part | was added dropwise thereto over a period of 3 hours with maintaining the temperature at 100° C. Then, the mixture was aged at 100° C. for 3 hours to obtain a milky-white polymer dispersion (B-1), 50% of which was nonvolatile matter. A light intensity average particle size according to dynamic light scattering (herainafter, simply referred to as "particle size") was 370 nm.

Production Example 10

A milky-white polymer dispersion (B-2) was obtained in a similar manner to Production Example 9 with the exception that the following mixture was used as a monomer mixture to be used for the production of a dispersion stabilizer for polymer dispersion. The particle size was 350 nm.

| | | |
|---|---|---|
| FANCRYL FA-512MT (Note 3) | 10 | parts |
| styrene | 25 | parts |
| n-butyl methacrylate | 12 | parts |
| i-butyl methacrylate | 33 | parts |
| 2-ethylhexyl acrylate | 20 | parts |
| 2,2'-azobisisobutyronitrile | 1 | part |

(Note 3) "FANCRYL FA-512MT": manufactured by Hitachi Chemical Co., Ltd., an oxidatively curable monomer shown in the following formula:

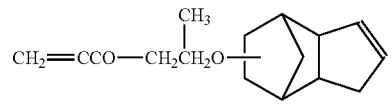

Production Example 11

A milky-white polymer dispersion (B-3) was obtained in a similar manner to Production Example 9 with the exception that the following mixture was used as a monomer mixture to be used for the production of a dispersion stabilizer for polymer dispersion. The particle size was 320 nm.

| | | |
|---|---|---|
| FANCRYL FA-512MT (Note 3) | 40 | parts |
| styrene | 15 | parts |
| n-butyl methacrylate | 12 | parts |
| i-butyl methacrylate | 23 | parts |
| 2-ethylhexyl acrylate | 20 | parts |
| 2,2'-azobisisobutyronitrile | 1.5 | parts |

Preparation of Coating Composition

Examples 1 to 4 and Comparative Example 1

Using each of the 45% urethane-modified vinyl resin solutions obtained in the above Production Examples, each cold setting coating composition was obtained by adding each component at the mixing composition shown in Table 1 (shown by solid matters) to an one-liter volume mayonnaise bottle together with 250 parts of glass beads having a diameter of 2 mm, stirring at a paint shaker for 2 hours to form a pigment paste, adding the above 45% urethane-modified vinyl resin solution as well as cobalt naphthenate and lead naphthenate as shown in the table, stirring the whole to form a homogeneous mixture, and removing the glass beads. By the way, in Comparative Example 1, the fatty acid-modified copolymer solution (a-1) was used instead of the urethane-modified vinyl resin solution.

Performance Tests

Upon each of the cold setting coating compositions obtained in the above examples 1 to 4 and Comparative Example 1, various tests were carried out according to the following test methods. The test results were shown in following Table 1.

Test Methods (*1) Initial dryness: After a glass plate was coated with each cold setting coating composition by means of a 300 μm applicator, the finger-contact dryness of the coated film after standing at 20° C. under 70% RH for 6 hours was determined and evaluated according to the following standard.
  ⊚: No fingerprint is marked.
  ○: Slight fingerprint is marked.
  Δ: Fingerprint is marked.
  X: ?The coated film adheres to finger.

(*2) Gloss of the coated film: After a glass plate was coated with each cold setting coating composition by means of a 300 µm applicator, a 60° specular reflection rate of the coated film after drying in a room at 20° C. under 70% RH for 1 week was determined and evaluated according to the following standard.
⊚: 90% or more
○: from 80% to less than 90%
Δ: from 70% to less than 80%
X: less than 70%

(*3) Weathering resistance: After a slate plate coated with "ALES RETAN" (manufactured by Kansai Paint Co., Ltd., a white glossy coating) was coated with each cold setting coating composition by means of a 300 µm applicator and the whole was dried in a room at 20° C. under 70% RH for 1 week, gloss-retaining rate was evaluated after exposure to sunshine wetherometer for 1500 hours.
⊚: 90% or more
○: from 80% to less than 90%
Δ: from 70% to less than 80%
X: less than 70%

(*4) Water resistance: After a slate plate was coated with each cold setting coating composition by means of a 300 µm applicator and the whole was dried in a room at 20° C. under 70% RH for 1 week, the state of the coated film after immersing the coated plate in a tap water (20° C.) for 3 days was observed and evaluated according to the following standard.
○: No change
Δ: Slight swelling is observed.
X: Remarkable swelling is observed.

(*5) Acid resistance: On the coated plate obtained as in (*1) was added dropwise 0.5 cc of 0.1N sulfuric acid aqueous solution, and after standing at 20° C. for 24 hours, the state of the coated plate after washing with water was observed.
○: No change
Δ: Slight whitening is observed.
X: Remarkable whitening and etching at the surface are observed.

(*6) Hot and cold repeating test: A slate plate was coated with "ALES GUM TILE Sealer" (manufactured by Kansai Paint Co., Ltd., a sealer) in an amount of 150 g/m² by means of a brush, overcoated under draw-painting with "ALES Rubber Tile Rough" (manufactured by Kansai Paint Co., Ltd., a thickness-imparting main agent for outside of a building) by means of a 2 mm blade, and allowed to stand for 24 hours. Then, after the coated plate was coated with each cold setting coating composition in an amount of 120 g/m² by means of a brush and allowed to stand for 4 hours, the plate was overcoated with the same cold setting coating composition in an amount of 120 g/m² by means of a brush to form a test coated plate. The test coated plate was subjected to a test according to a hot and cold repeating test of JIS A-6909, one cycle of which comprises <immersion in water for 18 hours—cooling in a constant-temperature bath of −20° C. for 3 hours—heating in a constant-temperature bath of 50° C. for 5 hours>. After the test of 15 cycles, the state of the coated surface was observed by eye.
⊚: No change
○: Slight swelling is observed.
Δ: Crack and swelling are observed at a part of the plate.
X: Remarkable crack and swelling are observed all over the plate.

TABLE 1

|  |  |  |  | Example | | | | Comparative Example |
|---|---|---|---|---|---|---|---|---|
|  |  |  |  | 1 | 2 | 3 | 4 | 1 |
| Coating mixture | Pigment dispersion | Resin solution | Kind | A-1 | A-2 | A-3 | A-4 | a-1 |
|  |  |  | Amount | 60 | 60 | 60 | 60 | 54 |
|  |  | Titanium white |  | 108 | 108 | 108 | 108 | 108 |
|  |  | Mineral spirit |  | 75 | 75 | 75 | 75 | 81 |
|  | Resin solution |  | Kind | A-1 | A-2 | A-3 | A-4 | a-1 |
|  |  |  | Amount | 240 | 240 | 240 | 240 | 216 |
|  | Cobalt naphthenate |  |  | 0.4 | 0.4 | 0.4 | 0.4 | 0.4 |
|  | Lead naphthenate |  |  | 1.4 | 1.4 | 1.4 | 1.4 | 1.4 |
| Performance tests | Initial dryness |  |  | ○ | ○ | ○ | ○ | ○ |
|  | Gloss of the coated film |  |  | ⊚ | ⊚ | ○ | ○ | Δ |
|  | Weathering resistance |  |  | ○ | ○ | ○ | ⊚ | Δ |
|  | Water resistance |  |  | ○ | ○ | ○ | ○ | ○ |
|  | Acid resistance |  |  | ○ | ○ | ○ | ○ | ○ |
|  | Hot and cold repeating test |  |  | ○ | ○ | ⊚ | ○ | Δ |

Preparation of Coating Composition

Example 5

Using the urethane-modified vinyl resin solution (A-5) and the polymer dispersion liquid (B-1) obtained in the above Production Examples, a coating composition was obtained by mixing the components at the mixing composition shown in Table 2 (shown by solid matters), adding 0.3% by weight of cobalt naphthenate and 1.0% by weight of lead naphthenate as curing catalysts based on the total resin solid matter, stirring the whole to form a homogeneous mixture, mixing with 20 parts of mineral spirit, 40 parts of "JR603" (TAYCA Corporation, titanium white), 2 parts of "DISPARLON 6900-10X" (manufactured by Kusumoto Chemical Co., Ltd., a sagging inhibitor) and 0.8 part of "BYK-066" (manufactured by BYK-Chemie Co., a defoaming agent), dispersing the whole in a sandmill, and controlling the viscosity to 75 to 90 KU with mineral spirit.

Examples 6 to 12 and Comparative Examples 2 and 3

Each coating composition was obtained in a similar manner to Example 5 with the exception that the composition was changed to each mixing composition shown in Table 2 (shown by solid matters).

TABLE 2

|  |  | Example | | | | | | | | Comparative Example | |
|---|---|---|---|---|---|---|---|---|---|---|---|
|  |  | 5 | 6 | 7 | 8 | 9 | 10 | 11 | 12 | 2 | 3 |
| Urethane-modified vinyl resin | Kind | A-5 | A-5 | A-5 | A-6 | A-5 | A-5 | A-7 | A-8 | A-9 | |
|  | Amount | 50 | 50 | 50 | 50 | 50 | 50 | 50 | 50 | 50 | |
| Polymer dispersion | Kind | B-1 | B-2 | B-3 | B-1 | B-1 | B-1 | B-1 | B-1 | B-1 | B-3 |
|  | Amount | 50 | 50 | 50 | 50 | 50 | 30 | 50 | 50 | 50 | 100 |
| Cobalt naphthenate | | 0.3 | 0.3 | 0.3 | 0.3 | | 0.3 | 0.3 | 0.3 | 0.3 | 0.3 |
| Lead naphthenate | | 1.0 | 1.0 | 1.0 | 1.0 | 1.0 | 1.0 | 1.0 | 1.0 | 1.0 | 1.0 |
| Manganese naphthenate | | | | | | 0.3 | | | | | |
| Mineral spirit | | 20 | 20 | 20 | 20 | 20 | 20 | 20 | 20 | 20 | 20 |
| JR603 | | 40 | 40 | 40 | 40 | 40 | 40 | 40 | 40 | 40 | 40 |
| Disparlon 6900-10 | | 2 | 2 | 2 | 2 | 2 | 2 | 2 | 2 | 2 | 2 |
| BYK-066 | | 0.8 | 0.8 | 0.8 | 0.8 | 0.8 | 0.8 | 0.8 | 0.8 | 0.8 | 0.8 |

Further in Comparative Example 2, the following acrylic resin solution (Note 4) was used instead of the urethane-modified vinyl resin solution.

(Note 4) Into a flask was charged 80 parts of mineral spirit, followed by the elevation of temperature to 110° C. under stirring with introducing nitrogen gas. Then, a mixture of:

| styrene | 25 parts |
| n-butyl methacrylate | 12 parts |
| i-butyl methacrylate | 43 parts |
| 2-ethylhexyl acrylate | 20 parts |
| 2,2'-azobisisobutyronitrile | 1.5 parts | was added dropwise thereto over a period of 4 hours with maintaining the temperature at 110° C. Then, after the temperature was elevated to 120° C., the mixture was aged for 2 hours to obtain an almost colorless clear viscous acrylic resin solution (A-9), 55% of which was nonvolatile matter.

Performance Tests

Upon each cold setting coating composition obtained in the above examples 5 to 12 and Comparative Examples 2 and 3, storage stability was evaluated by observing the state of the coated film after an one month storage at 40° C. (○: no change). Furthermore, various tests were carried out according to the following test methods. The test results were shown in following Table 3.

TABLE 3

|  | Example | | | | | | | | Comparative Example | |
|---|---|---|---|---|---|---|---|---|---|---|
|  | 5 | 6 | 7 | 8 | 9 | 10 | 11 | 12 | 2 | 3 |
| Storage stability | ○ | ○ | ○ | ○ | ○ | ○ | ○ | ○ | ○ | ○ |
| Initial dryness | ○ | ◉ | ◉ | ◉ | ○ | ○ | ○ | ○ | ○ | ◉ |
| Workability at twice coating | ○ | ○ | ○ | ○ | ○ | ○ | ○ | ○ | X | Δ |
| Gloss of the coated film | ○ | ○ | ○ | ○ | ○ | ○ | ○ | ○ | ○ | X |
| Water resistance | ○ | ○ | ○ | ○ | ○ | ○ | ○ | ○ | ○ | ○ |
| Acid resistance | ○ | ○ | ○ | ○ | ○ | ○ | ○ | ○ | ○ | ○ |
| Alkali resistance | ○ | ○ | ○ | ○ | ○ | ○ | ○ | ○ | ○ | ○ |
| Hot and cold repeating test | ○ | ○ | ○ | ○ | ○ | ○ | ○ | ○ | Δ | X |
| Elongation rate (%) | 52 | 41 | 33 | 50 | 53 | 65 | 45 | 70 | 50 | 20 |

Test Methods (*7) Initial dryness: After a glass plate was coated with each composition by means of a 300 μm applicator, the finger-contact dryness of the coated film after standing at 20° C. under 75% RH for 6 hours was determined.

◉: No fingerprint is marked.
  ○: Slight fingerprint is marked.
  Δ: Fingerprint is marked.
  X: The coated film adheres to finger.

(*8) Workability at twice coating: A glass plate was coated with each composition by means of a 300 μm applicator, and then the whole was allowed to stand at 20° C. under 75% RH for 6 hours. Thereafter, each composition was again applied thereon by means of a brush so as to form a film having a dry thickness of 80 to 100 μm and then the state of the coated film was observed.

○: no change
  Δ: Shrinkage of the coated film is observed.
  X: The coated film of the first coating is re-dissolved and therefore the brushing at coating becomes heavy.

(*9) Gloss of the coated film: After a slate plate coated with "ALES CELA MILD" (manufactured by Kansai Paint Co., Ltd., a white mat coating) was coated with each cold setting coating composition by means of a 300 μm applicator and the whole was dried for 1 week, a 60° specular reflection rate was determined, and the case of 80% or more was marked ○ and the case of less than 80% was marked X.

(*10) Water resistance: After a slate plate was coated with each composition by means of a 300 μm applicator and the whole was dried at room temperature, the state of the coated film after immersing the coated plate in a tap water (20° C.) for 3 days was observed.

○: No change
  Δ: Slight swelling is observed.
  X: Remarkable swelling is observed.

(*11) Acid resistance: On the coated plate obtained as in (*7) was added dropwise 0.5 cc of 0.1N sulfuric acid aqueous solution, and after standing at 20° C. for 24 hours, the state of the coated plate after washing was observed.

○: No change
  Δ: Slight whitening is observed.
  X: Remarkable whitening and etching at the surface are observed.

(*12) Alkali resistance: On the coated plate obtained as in (*7) was added dropwise 0.5 cc of 0.1N sodium hydroxide aqueous solution, and after standing at 20° C. for 24 hours, the state of the coated plate after washing was observed.
○: No change
Δ: Slight whitening is observed.
X: Remarkable whitening and etching at the surface are observed.

(*13) Hot and cold repeating test: A slate plate coated with "ALES HOLDER G II" (manufactured by Kansai Paint Co., Ltd., a white slightly elastic primer) was coated with each coating composition whose viscosity was controlled to 70 KU with mineral spirit, in an amount of 200 g/m² by means of a roller and the whole was dried for 14 days to form a test coated plate. The test coated plate was subjected to the test according to a hot and cold repeating test of JIS A-6909, one cycle of which comprises <immersion in water at 20° C. for 18 hours—cooling in a constant-temperature bath of −20° C. for 3 hours—heating in a constant-temperature bath of 50° C. for 5 hours>. After the test of 10 cycles, the state of the coated surface was observed by eye.
○: No change
Δ: Crack is observed at a part of the plate.
X: Remarkable crack is observed all over the plate.

(*14) Elongation rate of the coated film: After a release paper was coated with each composition by means of a 300 μm applicator and dried at room temperature for 7 days, a free film having 5 mm width ×20 mm length was collected and an elongation rate (%) was measured after the coated film was drawn at a rate of 10 mm/minute.

The coating composition of the present invention improves weathering resistance and water resistance of the resulting coated film and further improves crack-following ability of the undercoat by using an oxidatively curable urethene-modified vinyl resin as a film-forming component. Accordingly, the coating composition of the present invention serves extremely excellent effects when used for outside of a building, particularly for inorganic building materials.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

The disclosure of Japanese Patent Application Nos. 2000-069881 and 2000-075653 filed Mar. 14, 2000 and Mar. 17, 2000 respectively, including the specifications, drawings and claims, is incorporated herein by reference in their entirety.

What is claimed is:

1. A cold setting coating composition comprising:
an urethane-modified vinyl resin (A) produced by reacting a reaction product with an isocyanate group-possessing compound (c), the reaction product produced by reacting an epoxy group-containing vinyl copolymer (a) with a fatty acid component (b) containing an unsaturated fatty acid,
said vinyl copolymer (a) is a copolymer of a first polymerizable unsaturated monomer containing an epoxy group and a second polymerizable unsaturated monomer; and
a polymer dispersion (B) obtained by polymerizing two or more of vinyl monomers in the presence of a dispersion stabilizer (d) in an organic liquid in which vinyl monomers are soluble and a polymer formed from the monomers is insoluble, wherein the dispersion stabilizer (d) is soluble in the organic liquid.

2. The cold setting coating composition according to claim 1, wherein the vinyl copolymer (a) is produced by copolymerizing 3 to 70% by weight of the first polymerizable unsaturated monomer containing an epoxy group with 30 to 97% by weight of the second polymerizable unsaturated monomer.

3. The cold setting coating composition according to claim 1, the vinyl copolymer (a) has a number average molecular weight of 1,000 to 100,000 and a glass transition temperature of 0 to 100° C.

4. The cold setting coating composition according to claim 1, the fatty acid component (b) has an iodine value of 50 to 200.

5. The cold setting coating composition according claim 1, wherein a ratio of the fatty acid component (b) is from 1 to 60 parts by weight based on 100 parts by weight of the vinyl copolymer (a).

6. The cold setting coating composition according claim 1, wherein an equivalent ratio of isocyanate group contained in the isocyanate group-possessing compound (c) to hydroxyl group contained in the reaction product (NCO/OH) is from 0.05 to 2.0.

7. The cold setting coating composition according to claim 1 comprises 10 to 90% by weight of the urethane-modified vinyl resin (A) and 90 to 10% by weight of the polymer dispersion (B) based on total solid matter weight of the resin (A) and the dispersion (B).

8. The cold setting coating composition according claim 1, the dispersion stabilizer (d) is a resin having an oxidatively polymerizable double bond.

9. The cold setting coating composition according claim 8, the resin having an oxidatively polymerizable double bond is obtained by copolymerizing 5 to 70% by weight of a vinyl monomer having an oxidatively polymerizable double bond and 30 to 95% by weight of another vinyl monomer.

10. The cold setting coating composition according claim 1, at least one of two or more of vinyl monomers is a multi-vinyl compound.

* * * * *